Dec. 2, 1930. M. H. MARTIN 1,783,737
CAR TRUCK
Filed Dec. 12, 1928   2 Sheets-Sheet 1
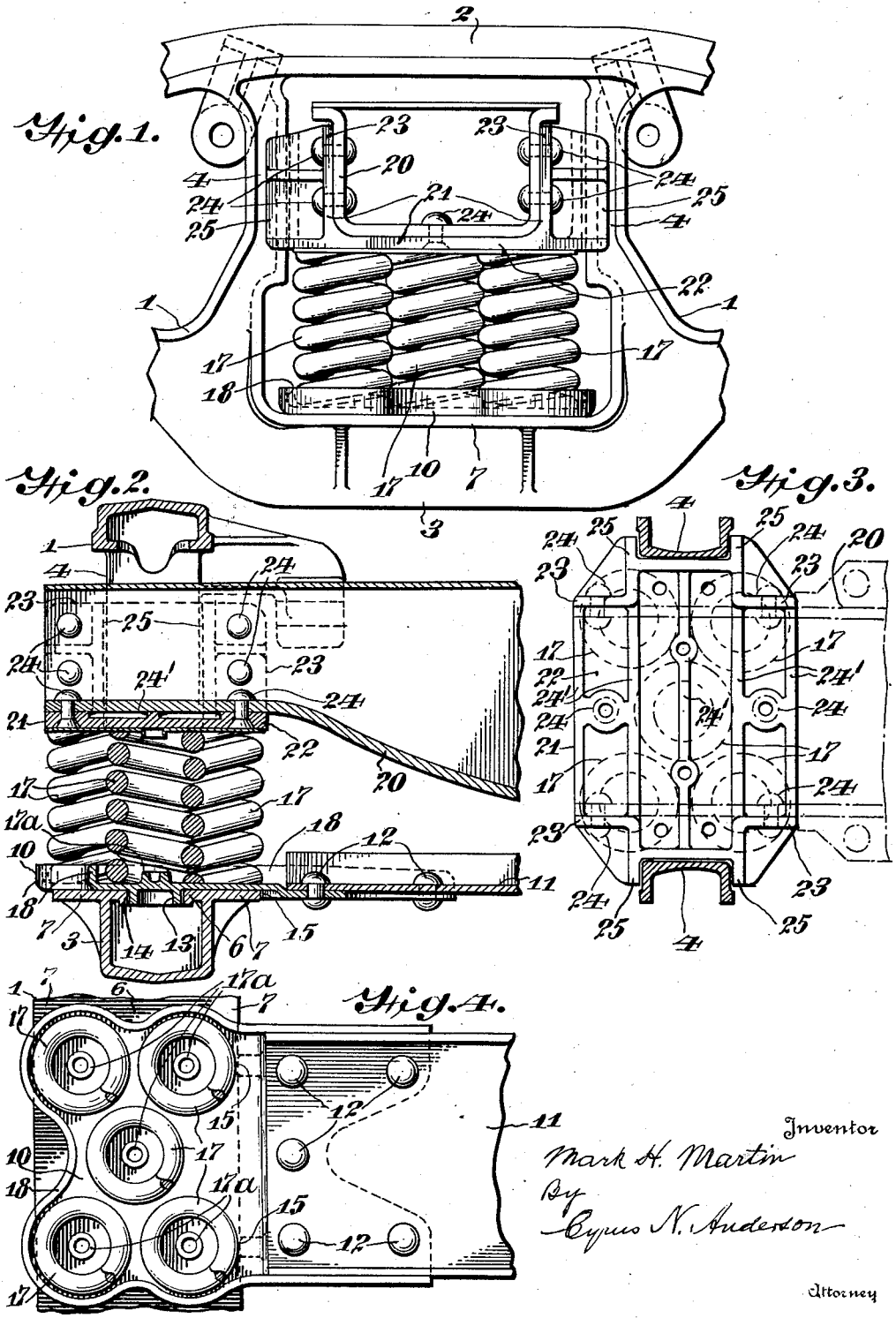

Dec. 2, 1930.  M. H. MARTIN  1,783,737
CAR TRUCK
Filed Dec. 12, 1928  2 Sheets-Sheet 2
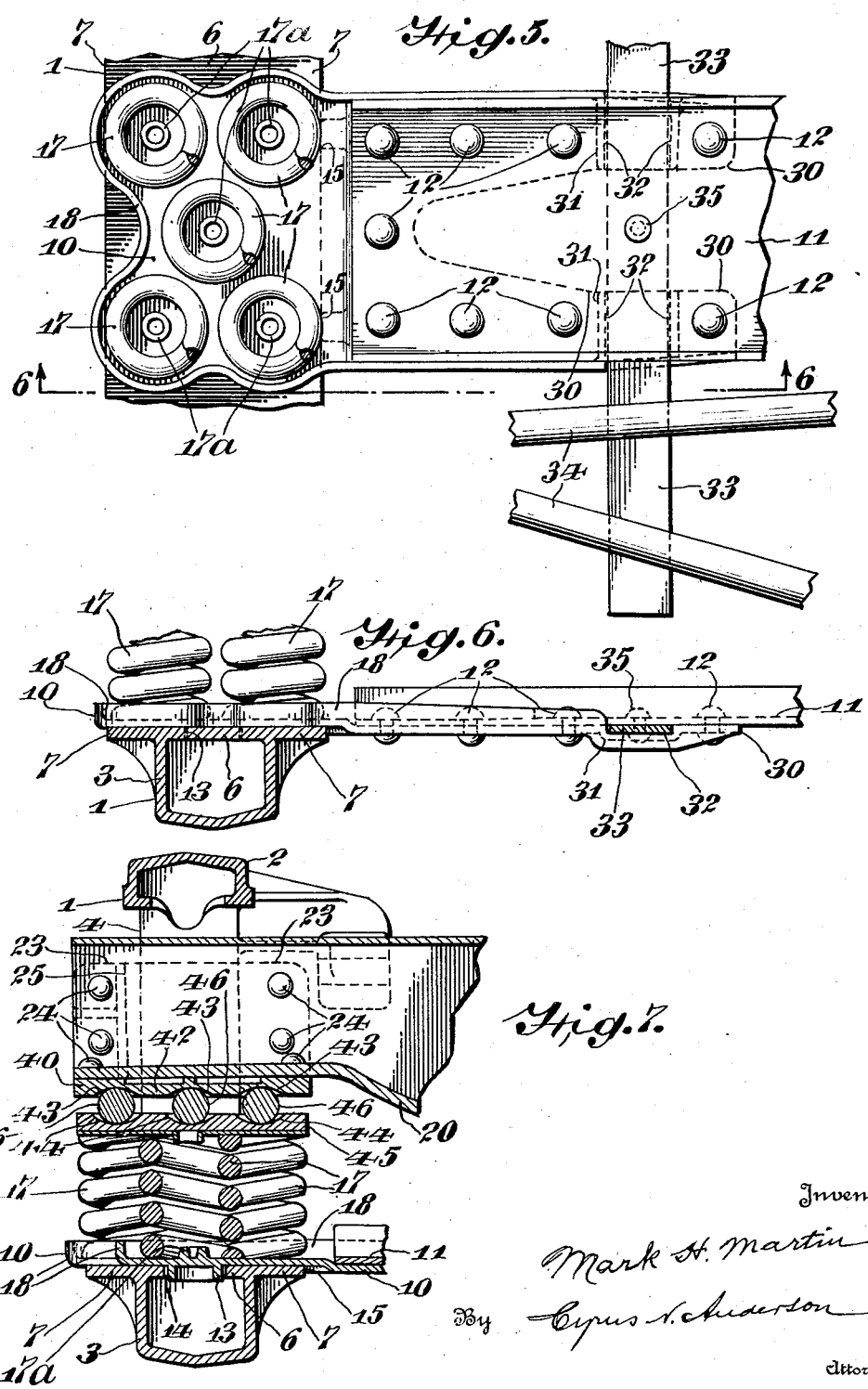

Patented Dec. 2, 1930

1,783,737

UNITED STATES PATENT OFFICE

MARK H. MARTIN, OF READING, PENNSYLVANIA, ASSIGNOR TO BIRDSBORO STEEL FOUNDRY & MACHINE COMPANY, OF BIRDSBORO, PENNSYLVANIA, A CORPORATION OF PENNSYLVANIA

CAR TRUCK

Application filed December 12, 1928. Serial No. 325,494.

My invention relates broadly to railway car trucks but more particularly to means whereby a truck may be altered or repaired and provided with an increased number of springs for supporting the truck bolsters.

The general object of my invention is to provide means of novel construction whereby upon the alteration or repair of a car truck the number of springs for supporting the truck bolster may be increased to thereby increase the load-supporting capacity of the structure.

A further object of the invention is to provide a sectional spring seat plank for a car truck, the spring seat sections of which are adapted to support an increased number of springs.

Another object of my invention is to provide means whereby a truck bolster may be adapted to cooperate with bolster columns which are spaced substantially wider distances apart than the width of said bolster.

Further objects and advantages of my invention will be pointed out in the detailed description thereof which follows or will be apparent from such description.

In order that the invention may be readily understood and its manifold objects and advantages more fully appreciated, reference should be had to the accompanying drawings in which certain embodiments thereof are illustrated. However, it will be understood that the invention may be embodied in other forms of construction than those which are shown in the drawings and that changes in the details of construction may be made within the scope of the claims without departing from the said invention or the principle thereof:

In the drawings,—

Fig. 1 is a view in side elevation of the central portion of a railway car truck embodying my invention;

Fig. 2 is a view partly in elevation and partly in vertical transverse section of a fragmentary portion of a railway car truck frame embodying the invention in the form shown in Fig. 1;

Fig. 3 is a view in top plan of one end portion of a truck bolster provided with means for widening the same;

Fig. 4 is a similar view showing an outer end portion of the sectional spring plank, the outer end portion of which is shown in side edge elevation in Fig. 1;

Fig. 5 is a view similar to that shown in Fig. 4 but showing a modified construction of sectional spring plank;

Fig. 6 is a view taken on the line 6—6 of Fig. 5; and

Fig. 7 is a view similar to that shown in Fig. 2 but showing a modified construction embodying the invention.

The invention is not limited to a structure comprising any given number of springs, but for purposes of illustration it may be assumed that it is desired to increase the number of springs from four to five. In the drawings I have illustrated but one side portion of a railway car truck frame, but it will be understood that the invention when employed is embodied in both sides of a railway car truck and results in the substitution of new truck side frames adapted to accommodate spring seat planks with end portions of sufficient width to accommodate an increased number of bolster springs and also to accommodate the means employed for increasing the widths of the end portions of the truck bolsters to adapt the same for cooperation with the increased number of springs.

For the purpose of increasing the load-supporting capacity of a railway car truck it may be necessary to provide truck side frames of increased strength and also bolster springs having increased load-supporting capacity. At any rate, whenever the load-supporting capacity of the truck side frames is increased it will be necessary to increase the distance between the bolster columns of the said frame, as will be apparent as this description proceeds.

The side frame indicated as a whole at 1 comprises a compression member 2 and a tension member 3. Bolster columns 4 extend between the said compression and tension members in spaced relation to each other to provide what is generally called a bolster window. The distance between the bolster columns of the new or substituted truck side frame is sufficient to permit the employment of bolster spring plates having spring-supporting end portions of a width to accommodate an increased number of bolster springs, for example, five springs instead of four.

The top web 6 of the tension member 3 is provided with laterally extending shelves 7 which, together with the horizontal portion of the web 6 form a spring plank seat the surface of which is substantially plane. The spring plank comprises end portions 10 (only one of which is shown) and an intermediate portion 11, the end portions and intermediate portion being connected by rivets, as shown at 12. The portion 10 shown in the drawing rests upon the spring plate seat and is retained thereon by a centrally disposed downwardly extending boss 13 which projects through an opening 14 provided in the web 6 of the tension member. Shoulders 15 preferably are provided on the bottom side of the member 10 which shoulders engage the edge of the inner shelf 7 and cooperate with the boss 13 in retaining the spring plank upon its seat. These shoulders also constitute means whereby the said spring plank operates to maintain the side frames of the car truck in parallel or squared relation to each other. The portion 10 of the spring plank is of sufficient size to receive and hold the five spring 17 arranged in relation to each other as shown in Fig. 4, the said springs being retained in position by bosses such as shown at 17a. It will be understood that the portion 10 of the spring plank may be made sufficiently large to accommodate a greater number of springs. The sides and end of the portion 10 are curved, as shown, and are provided with an upwardly extending flange 18 having portions which hug adjoining portions of the four outside springs as shown.

The portion 10 of the spring plank preferably consists of a steel casting and by providing such a casting the intermediate portion of the spring plank employed in the railway car truck prior to the reconstruction thereof may be employed in constructing a spring plank having a greater spring capacity. Such use of the old spring plank of the railway car truck is effected by removing the outer spring-engaging portions thereof and connecting the remaining intermediate portion such as is shown at 11 to the portions 10 of the new spring plank. By constructing a spring plank in this manner a great saving in material is effected.

In order to enable the old truck bolster of the railway car truck (the end of which is shown at 20) to be employed in reconstructing the railway car truck it is necessary to provide means for widening the outer ends of the said bolster to accommodate the additional springs. Such widening of the outer ends of the truck bolster is produced by connecting thereto a member such as that shown at 21. Preferably the member 21 consists of a box-like casting having a base 22 and sides 23. The opposite ends of the truck bolster are located within the box-like members 21 and are secured thereto by rivets 24. The top side of the base 22 may be provided with strengthening ribs 24' as shown in Fig. 3, if desired. The sides 23 of the box-like member 21 are provided with pairs of outwardly extending projections or guide lugs 25 which engage the opposite sides of the bolster columns 4, as shown in Fig. 3.

It now will be seen that I have provided a novel construction of means whereby the truck bolster of a railway car truck may be employed in reconstructing the said truck to increase the number of springs carried by the side frames thereof. My invention also presents the advantages which result from forming the spring cap and the guide lugs in an integral casting.

In Figs. 5 and 6 I have shown a spring plank construction similar to that shown in Figs. 2 and 4 but showing the inner end portions of the part 10 of the spring plank extended inwardly at 30. The extensions 30 are offset downwardly at 31 to provide openings 32 between the said extensions 30 and the overlying intermediate portion 11 of the spring plank. The openings 32 are adapted to receive a member 33 which extends therethrough underneath the spring plank and the outer ends of which project underneath the brake beams which are located on both sides of and above the spring plank. Portions of one of the said brake beams are shown at 34. The member 33 is adapted to support the brake beams when the latter fall into contact therewith. The said member 33 is held in position by a retaining pin or rivet 35 which projects through openings provided in the spring plank and the said member. By constructing the outer portion of a spring plank in the manner herein set forth I am enabled to provide increased spring capacity and also to provide suitable means for holding and supporting a brake beam supporting member.

In Fig. 7 I have shown a bolster construction which embodies a casting or member 40 which is similar to the member 21 shown in Figs. 1 and 2 but which differs from the said member 21 in that the base portion 42 thereof is made sufficiently thick to permit concave recesses 43 to be formed in the under side thereof which extend transversely across the said member. These recesses 43 are disposed directly above similar recesses 44 provided in the top side of the spring cap 45. Rollers 46 lie within the concave recesses 43 and 44. This construction permits lateral movements of the bolster 20 to which the member 40 is connected, such movements being limited by the outer pairs of projections or guide lugs 25 formed on the said member, the inner pairs thereof being omitted. As will be understood, the bolster is free to move in vertical directions.

It now will be seen that I have provided a novel and improved construction of means by the employment of which the number of springs carried by the side frames of a railway car truck may be increased far more economically than has been possible heretofore. By reconstructing the truck bolster and spring plank by means embodying my invention I am enabled to increase the carrying capacity of a railway car truck at less cost than has been possible heretofore.

Having thus described my invention, what I claim and desire to secure by Letters Patent is:

1. In a railway car truck the combination of a side frame having a bolster window formed therein, a bolster extending through the said window, a casting secured to the said bolster which casting comprises a base the said base constituting a spring cap, the ends of the said casting projecting laterally and upwardly with respect to the sides of the said bolster, the top side of the said base having ribs formed thereon extending transversely of the said bolster, and guide lugs formed on each end of the said casting.

2. In a railway car truck the combination of a side frame having a bolster window formed therein, a spring plank seat formed in the said side frame, a spring plank engaging said seat, said spring plank comprising a separate spring-engaging portion riveted to the intermediate portion of the said plank, a centrally disposed boss formed on the under side of the said portion of the spring plank, which boss extends through an opening provided in the said spring plank seat, and shoulders formed on the under side of the said portion of the spring plank, which shoulders engage the edge of the said spring plank seat.

3. In a railway car truck the combination of a side frame having a bolster window formed therein, a spring plank seat formed in the said side frame, a spring plank engaging said seat, said spring plank comprising a separate spring-engaging portion riveted to the intermediate portion thereof, said portion having a centrally disposed boss formed on the under side thereof and extending through an opening provided in the said spring plank seat, shoulders formed on the under side of the said portion of the spring plank, which shoulders are adapted to engage the inner edge of the spring plank seat, the inner end of the said portion having an inwardly extending projection formed thereon, and a recess formed in the said projection whereby the latter is adapted to support a break beam supporting member.

4. In a railway car truck the combination of a side frame comprising compression and tension members, bolster columns extending between the said members the presence of which causes a bolster window to be formed, a bolster extending through the said window, the width of the said bolster being considerably less than the width of the said window, means for widening the end of the said bolster to correspond to the width of the said window, said means comprising a casting having a base portion, which base portion constitutes a spring cap, means formed on the top side of the said base for connecting the said member to the said bolster, laterally projecting guide lugs formed on each end of the said casting, springs located in the said bolster window for supporting the said bolster, a spring plank for the said springs, which plank comprises a separate spring-engaging portion riveted to the intermediate portion thereof, a centrally located boss formed on the under side of the said portion, and shoulders provided on the under side of the said portion.

5. In a railway car truck means for increasing the number of springs carried by the side frames of the said truck, said means comprising a casting adapted to be secured to the outer end of the truck bolster for widening the said bolster, means adapted to be connected to the end of the intermediate portion of the spring plank of the said truck, the said means comprising a spring-engaging member having a centrally located boss projecting from the under side thereof, and shoulders formed on the under side of the said spring-engaging member.

6. In a railway car truck, means for increasing the number of springs carried by the side frames of the said truck, said means comprising a member for widening the bolster of the said truck, which member comprises laterally projecting guide lugs for engaging the sides of the bolster columns of the said side frame, a spring cap formed integrally with the said member, and means for increasing the spring capacity of the spring plank seat, said means including a cast steel member adapted to be connected to the intermediate portion of the said spring plank, a centrally located downwardly extending boss formed on the under side of the said member, and shoulders provided on the under side of the said member.

7. In a railway car truck, means for increasing the spring capacity of the said truck, comprising a casting adapted to be connected to the bolster of the said truck for widening the said bolster, said casting comprising a spring cap, laterally projecting guide lugs formed on the said casting, means for increasing the capacity of the spring plank of the said truck comprising a cast steel member adapted to be connected to the intermediate portion of the said spring plank, and an inwardly extending projection formed on the said member said projection being adapted to support a brake beam supporting member.

In testimony that I claim the foregoing as my invention, I have hereunto signed my name this 10th day of December, A. D. 1928.

MARK H. MARTIN.